Jan. 5, 1943.  G. DE CROCE  2,307,576
RELAY SYSTEM
Filed Aug. 2, 1940

WITNESSES:
E. A. McCloskey
Joe Weber

INVENTOR
Gennero De Croce.
BY
ATTORNEY

Patented Jan. 5, 1943

2,307,576

UNITED STATES PATENT OFFICE 2,307,576

RELAY SYSTEM

Gennero De Croce, Kenmore, N. Y., assignor to Westinghouse Electric & Manufacturing Company, East Pittsburgh, Pa., a corporation of Pennsylvania Application August 2, 1940, Serial No. 349,787

6 Claims. (Cl. 171—314)

My invention relates, generally, to relay systems, and, more particularly, to a relay system responsive to a small range of potential variations.

In certain control systems it is necessary to employ some electrical potential responsive means that will function to operate and control contact elements in response to a comparatively narrow range of potential values. An example of such a control system is a control system for keeping a battery charged to a potential which may be allowed to vary within only a very narrow range.

Potential responsive relays, as they have been constructed heretofore, are merely contact-making voltmeters and have the disadvantage that they do not develop sufficient torque to make sufficiently reliable and positive contact for control purposes. A disadvantage of the use of a relay as a potential responsive device is that the value of its pick-up or actuating ampere-turns is so much higher than its drop-out or release ampere-turns that the relay cannot be made to respond to a sufficiently narrow range of potential values.

An object of my invention is to provide a relay system which shall function to respond to a comparatively narrow range of potential values and which shall make reliable and positive contact for control purposes.

Another object of the invention is to provide a control system for a battery-charging device which shall function to connect the battery-charging device in charging relation to a battery in response to a comparatively narrow range of values of battery potential.

A further object of the invention is to provide a relay system for control purposes responsive to a comparatively narrow range of potentials which shall be simple and efficient in construction and operation, and which shall be inexpensive to manufacture, install, operate and maintain.

Figure 1:
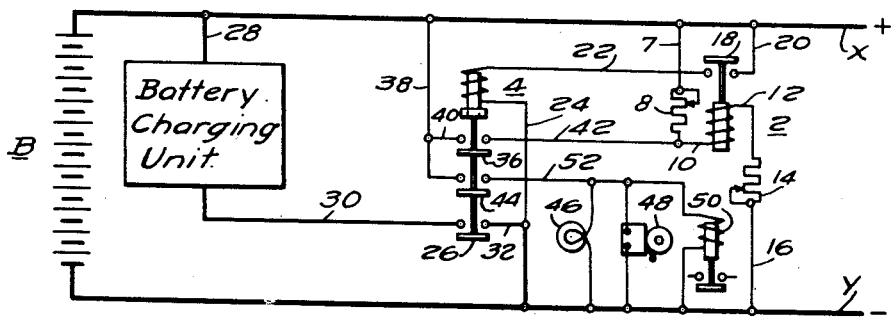
Figure 2:
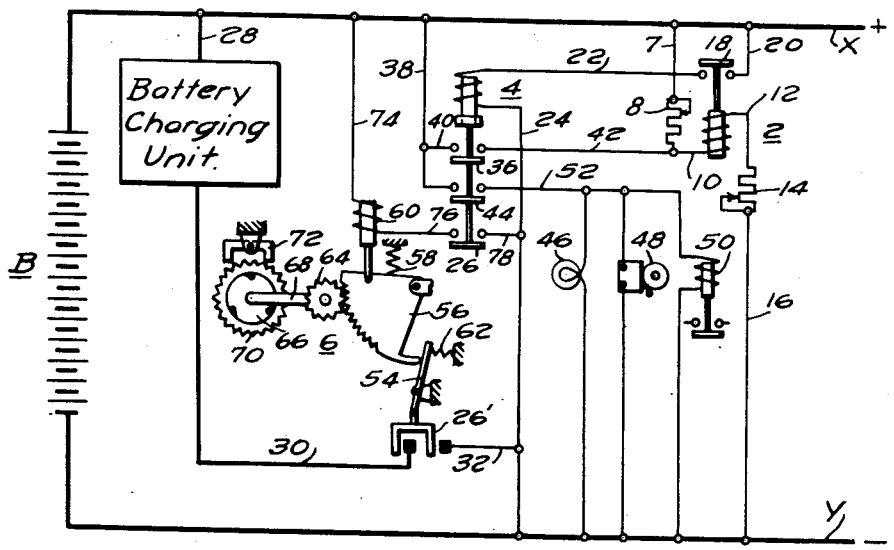

These and other objects and advantages will be apparent from the following detailed description taken in connection with the accompanying drawing, in which:

Figure 1 is a circuit diagram of a control system for a battery-charging device embodying the principal features of my invention; and Fig. 2 is a circuit diagram of another embodiment of a control system for a battery-charging device embodying the principal features of the invention.

In practicing the principles of the invention as illustrated in Fig. 1 of the drawing, a battery B is connected to supply power to a bus represented by the conductors X and Y which may be the control or auxiliary power bus for a substation, power station, or the like. A battery-charging unit as indicated is disposed to be connected in charging relation with the battery B by a relay system comprising relays 2 and 4 and associated circuit connections when the battery potential falls below a predetermined value, and to be disconnected from the battery when the battery potential has increased to a predetermined value.

The embodiment of Fig. 2 includes a timing device 6 disposed to retain the connection between the battery and the charging device for a predetermined time after they are connected by the potential responsive relay system.

Considering the embodiment of Fig. 1 more in detail, the relay 2 is connected across the conductors X and Y in a circuit which extends from conductor X through a conductor 7, a variable resistor 8, a conductor 10, the winding of the relay 2, a conductor 12, a variable resistor 14 and a conductor 16 to the conductor Y. A back contact element 18 of the relay 2 is disposed to complete a circuit for the relay 4 which extends from the conductor X through a conductor 20, the contact element 18, a conductor 22, the winding of the relay 4, and a conductor 24 to the conductor Y.

A contact element 26 of the relay 4 is disposed to connect the battery-charging unit in charging relation with the battery B through a circuit which extends from the conductor X through a conductor 28, the battery-charging unit, a conductor 30, the contact element 26, and conductors 32 and 24 to the conductor Y. A contact element 36 of the relay 4 is disposed to complete a shunting circuit for the resistor 8 which extends from one side of the resistor 8 through conductors 7, X, 38 and 40, the contact element 36 and a conductor 42 to the other side of the resistor 8. A second contact element 44 of the relay 4 is disposed to complete an energizing circuit for indicating devices, such as an indicating lamp 46, an alarm bell 48 and a supervisory control relay 50, this circuit extending from the conductor X through the conductor 38 and the contact element 44 to a conductor 52, and thence through the indicating devices 46, 48 and 50 to the conductor Y.

The calibration of the energizing circuit for the relay 2 may be so adjusted by the proper adjustment of the variable resistors 8 and 14 as to cause the relay 2 to release or drop out to close its back contact element 18 when the battery potential falls below a desired predetermined value.

The relay 4 is provided with a delayed release device, such as a shading coil, or any other means which is common in the art, to delay the opening of its contact elements when its winding is deenergized.

In the operation of the system of Fig. 1, with the battery potential above the minimum allowable potential, the relay 2 will be energized and actuated to the position shown in the drawing, and the relay 4 will be deenergized because of the open-circuit position of the contact element 18 of the relay 2. If, now, the potential of the battery B should fall below the predetermined desired minimum, the relay 2 will release and close its back contact element 18. The closure of the back contact 18 will complete the energizing circuit for the relay 4 which will pick up and connect the battery-charging unit in charging relation with the battery B through its front contact element 28. At the same time the shunting circuit for the resistor 8 will be closed by the contact element 36 of the relay 4.

The contact element 44 of the relay 4 will also close the energizing circuit for the indicating devices 46, 48 and 50 which will function to indicate to the operator at the station that the battery potential has fallen below the desired minimum and the battery-charging unit is in operation. The supervisory control relay 50 may be any suitable relay which will initiate an indication over any suitable supervisory control system to indicate to an operator at a remote station that the battery-charging unit is in operation. The value of the resistance of the resistor 14 is so chosen as to provide the necessary ampere-turns to pick up the relay 2 when the potential of the battery B has been increased to the predetermined desired value.

When the battery-charging unit has increased the battery potential to the desired value, the relay 2 will pick up, opening the circuit of the relay 4 by moving the contact element 18 to open-circuit position. After a small time delay sufficient to permit the relay 2 to travel to its full actuated position, the relay 4 will drop out to disconnect the battery-charging unit, deenergize the indicating devices and remove the shunt from the resistor 8. The system will then be in normal position calibrated for release of the relay 2 when the battery potential drops below a predetermined value, as hereinbefore described.

The system of Fig. 1 is most suitable for use with a battery-charging unit of the type which will increase the battery potential gradually. In the event that a battery-charging unit in the nature of a motor-generator set is to be controlled by the system and connected in charging relation with the battery B, the system of Fig. 2 may be employed to insure that the charging unit be connected in battery-charging relation for a considerable interval of time each time it is so connected. It will be understood that if a battery-charging unit, such as a motor generator, were connected to the battery B by the system of Fig. 1, the battery potential or the potential across the conductors X and Y would immediately rise to the potential value necessary to pick up the relay 2, and the charging unit would be intermittently connected and disconnected from the battery.

The system of Fig. 2 is generally the same as that of Fig. 1, except that it includes a timing device 6 for maintaining the connection of the battery-charging unit in charging relation with the battery B for a considerable interval of time each time the battery potential falls below the predetermined value. The timing device 6 comprises a contact element 26′ operated by a pivoted lever 54 and held in open-circuit position by a pivoted arcuate link 56 which is biased by a spring member 58. A solenoid 60 is disposed to actuate the arcuate member against the bias of the spring 58 to permit the biasing spring 62 to move the contact element 26′ to closed-circuit position. The arcuate member 56 actuates an internal member 66 of a unidirectional clutch device through a shaft 68. The outer member 70 of the clutch device is energized by an escapement member 72 to delay its movement. The winding of the solenoid 60 is connected to be energized in a circuit which is completed by the contact element 26 of the relay 4, which circuit extends from the conductor X through the conductor 74, the winding of the solenoid 60, a conductor 76, contact element 26 and conductors 78 and 24 to the conductor Y.

In the operation of the system of Fig. 2 when the relay 4 is energized in response to the release of relay 2, the solenoid 60 will be energized to rotate the arcuate member 56 against the bias of the spring 58, thus permitting the biasing spring 62 to move the contact element 26′ to closed-circuit position to connect the battery-charging unit in charging relation with the battery. This movement of the arcuate member 56 will cause the inner clutch member 66 to rotate freely in the counter-clockwise direction. When the battery-charging unit is connected to the battery and the conductors X and Y, a potential will immediately rise to pick up the relay 2 which, in turn, will release the relay 4. When the relay 4 drops out or releases, the solenoid 60 will be deenergized and the biasing spring 58 will return the arcuate member 56 to move the contact element 26′ to open-circuit position after a time delay controlled by the escapement mechanism 72 which cooperates with the outer member 70 of the clutch mechanism. Thus the battery-charging unit will be connected to the battery for a definite interval depending upon the timing adjustment of the timing device 6 each time the battery potential falls below a predetermined value. It is to be understood that the timing device 6 is shown merely as an illustrative example, and that any suitable timing device may be employed for the purpose.

By the proper adjustment of the variable resistors 8 and 14, the difference between the values of the battery potential that will release and pick up the relay 2 may be made very small, so that the battery potential variation will be very small and a practically constant battery potential may be maintained.

Thus it will be seen that I have provided a relay system which shall function to respond to a very narrow range of potential variations, which shall provide the usual reliable and positive relay contact for control purposes, which shall so control a battery-charging unit as to maintain a battery potential substantially constant, and which shall be simple and efficient in construction and operation and inexpensive to manufacture, install, operate and maintain.

In compliance with the requirements of the patent statutes, I have shown and described herein the preferred embodiments of my invention. It is to be understood, however, that the invention is not limited to the precise constructions shown and described, but is capable of modification by one skilled in the art, the embodiments shown herein being merely illustrative of the principles of my invention.

I claim as my invention:

1. In a control system for a battery charging device, a relay connected to be energized by the battery, calibrating means for determining the battery voltage value at which the relay will release, second calibrating means for determining the battery voltage at which the relay will pick up, means responsive to the release of said relay for rendering said second calibrating means effective and connecting the charging device in charging relation with the battery, and timing means responsive to the release of said relay for automatically maintaining the charging connection between the charging device and the battery for a predetermined length of time regardless of the subsequent pick-up of the relay within the predetermined length of time.

2. In a control system for a battery charging device, a first relay connected to be energized by the battery, calibrating means for determining the battery voltage value at which the relay will release, a second relay, circuit means responsive to the release of the first relay for energizing the second relay, means for so recalibrating the first relay as to determine the battery voltage at which it will pick up, means responsive to the actuation of the second relay for rendering said recalibrating means effective and connecting the charging device in charging relation with the battery, and timing means responsive to said second relay for automatically maintaining the charging connection between the charging device and the battery for a predetermined length of time regardless of the pick-up of said first relay within the predetermined length of time.

3. In a control system for a battery charging device, a first relay connected to be energized by the battery, calibrating means for determining the battery voltage at which the relay will release, a second relay, delayed release means for said second relay, circuit means responsive to the release of the first relay for energizing the second relay, means for so recalibrating the first relay as to determine the battery voltage at which it will pick up, means responsive to the actuation of the second relay for rendering said recalibrating means effective and connecting the charging device in charging relation with the battery, and timing means responsive to said second relay for automatically maintaining the charging connection between the charging device and the battery for a predetermined length of time regardless of the pick-up of said first relay within the predetermined length of time.

4. In a control system for a battery charging device, a first relay connected to be energized by the battery, calibrating means for determining the battery voltage value at which the relay will release, a second relay, circuit means responsive to the release of the first relay for energizing the second relay, delayed release means for said second relay, circuit means responsive to the release of the first relay for energizing the second relay, indicating means responsive to the second relay, means for so recalibrating the first relay as to determine the battery voltage at which the first relay will pick up, means responsive to the actuation of the second relay for rendering said recalibrating means effective and connecting the charging device in charging relation with the battery, and timing means responsive to said second relay for automatically maintaining the charging connection between the charging device and the battery for a predetermined length of time regardless of the pick-up of said first relay within the predetermined length of time.

5. In a control system for a battery charging device, a relay connected to be energized by the battery, calibrating means for determining the battery voltage value at which the relay will release, indicating means, second calibrating means for so calibrating said relay as to determine the battery voltage value at which the relay will pick up, means responsive to the release of said relay for rendering said second calibrating means effective, actuating said indicating means, and connecting the charging device in charging relation with the battery, and timing means responsive to the release of said relay for automatically maintaining the charging connection between the charging device and the battery for a predetermined length of time regardless of the subsequent pick-up of the relay within the predetermined length of time.

6. In a relay system, a relay connected to a source of electrical power, calibrating means for determining the voltage value of the source of power at which the relay will release, calibrating means responsive to the release of said relay for so calibrating said relay as to determine the voltage value of the source of power at which the relay will pick up, a control circuit responsive to the release of said relay, and timing means responsive to the release of the relay for automatically maintaining said control circuit energized for a predetermined length of time regardless of the subsequent pick-up of the relay within the predetermined length of time.

GENNERO DE CROCE.